March 11, 1941.   E. O. SCHJOLIN   2,234,781
METAL AUTOMOBILE BODY
Filed June 19, 1937    6 Sheets-Sheet 4

Inventor
Eric Olle Schjolin
By Blackmore, Spencer & Hunt
Attorneys

March 11, 1941.   E. O. SCHJOLIN   2,234,781
METAL AUTOMOBILE BODY
Filed June 19, 1937   6 Sheets-Sheet 6

Inventor
Eric Olle Schjolin
By Blackmor, Spencer & Flint
Attorneys

Patented Mar. 11, 1941

2,234,781

UNITED STATES PATENT OFFICE 2,234,781

METAL AUTOMOBILE BODY

Eric Olle Schjolin, Pontiac, Mich., assignor to General Motors Corporation, Detroit, Mich., a corporation of Delaware Application June 19, 1937, Serial No. 149,178

21 Claims. (Cl. 296—28)

This invention relates to metal automobile bodies and is an improvement over the metal body described and claimed in my copending application Serial No. 41,062, filed September 18, 1935.

The invention relates to specific improvements in structural details of the automobile, particularly the head or front part, the floor, and the rear part between the wheel housings. The body is built as an integral unit and requires no chassis. It is a self-sustaining entity and differs from conventional bodies in that the part ordinarily considered the hood is formed as a rigid part of the body.

Figure 1:
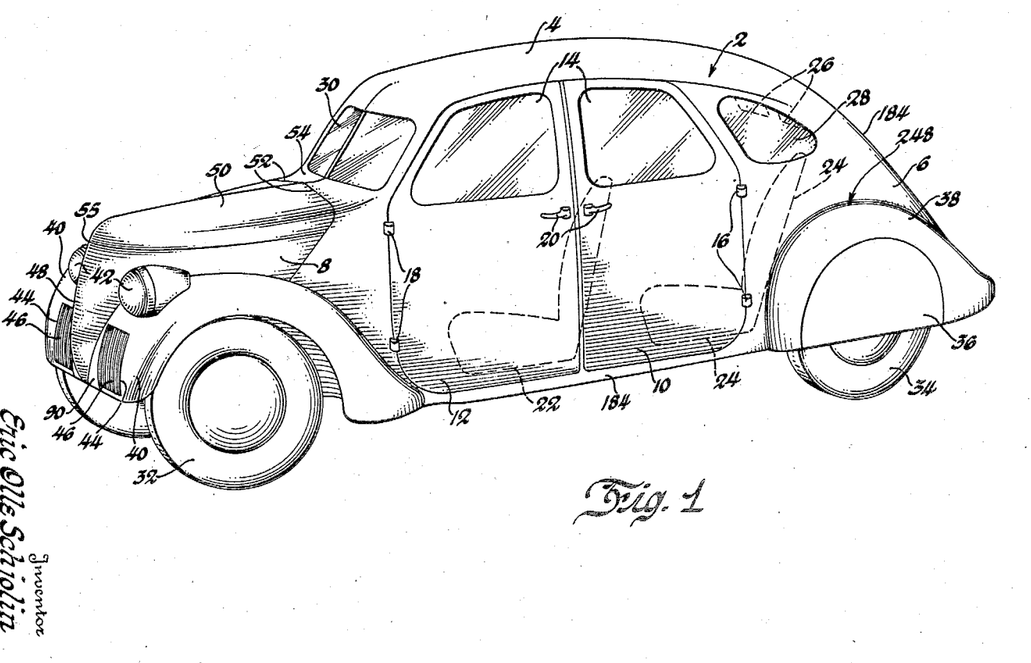
Figure 1 is a view of the body as a whole.

On the drawings the numeral 2 indicates the vehicle as a whole. The vehicle has the metal top 4, the tail or rear part 6, and the head or front part 8. The rear doors are indicated at 10, the front doors at 12, each door having a window 14 which is raisable and lowerable in the usual way. The rear doors are hinged to the rear body pillar by the hinges as at 16, while the front door 12 is attached to the front pillar by means of the hinges 18. The door handles are indicated at 20, the front seat at 22, and the rear seat at 24. The tail of the vehicle has the windows 26 while the sides to the rear of the rear doors 10 have the windows 28. The divided windshield is indicated at 30, the front wheels at 32 and the rear wheels at 34. If desired, the rear wheels may be covered by the removable pan 36. The rear fenders are indicated at 38.

The front fenders are indicated at 40 and the headlamps at 42, the headlamps being mounted on the fenders 40. Each fender 40 has a rectangular opening 44 in the front part thereof in which there is mounted the grille 46, each grille 46 having a small radiator in back thereof. The head 8 has the nose 48 extending forwardly between the fenders 40 and also the lid 50 hinged at its rear end at 52, and being adapted to be raised and lowered to allow access to the front compartment which is used to store the spare tire, tools, or packages. The cowl 54 is provided at its front tip 55 with a suitable releasable catch.

Figure 2:
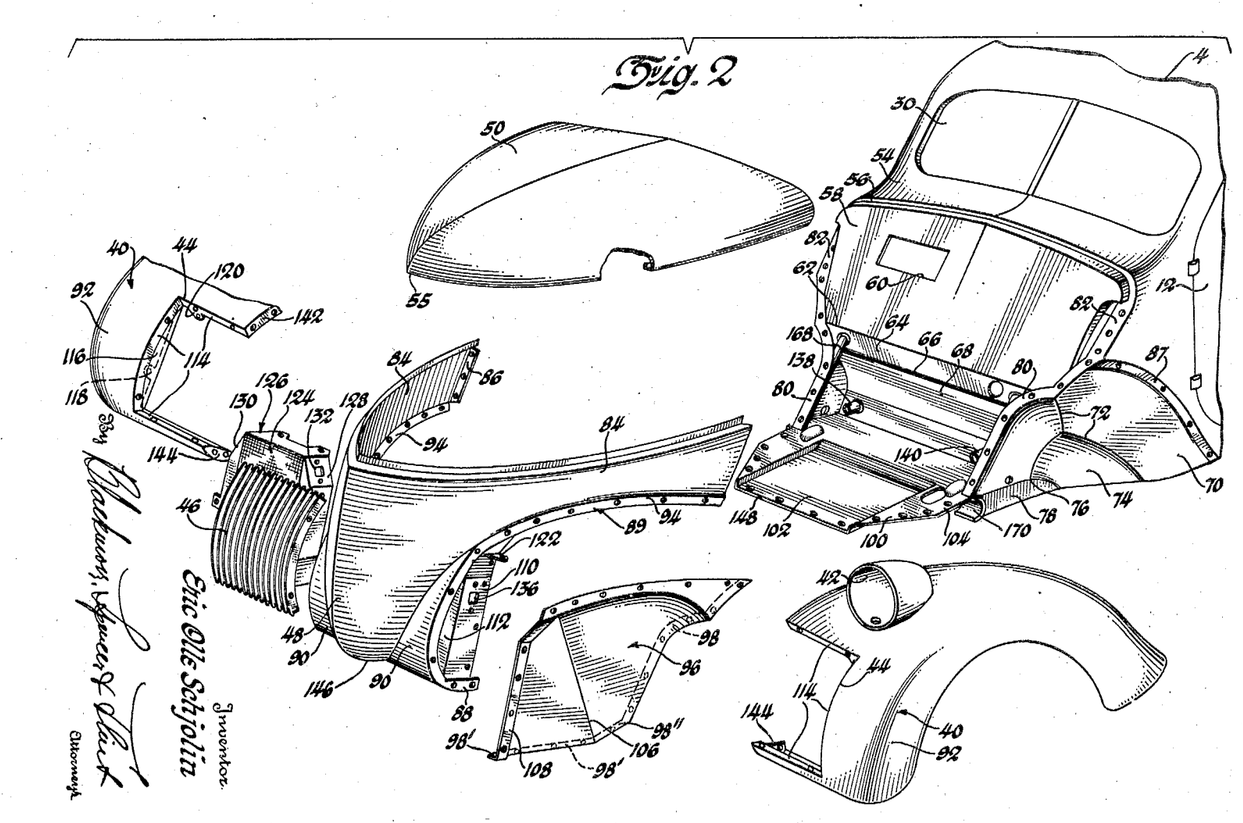
Figure 2 is an expanded view of the head or front part of the body.

Referring to Figure 2, it will be noted that the cowl 54 has the usual ledge 56 to receive the rear edge of the lid 50. The shroud or cowl pan 58 is forwardly and downwardly inclined and has the opening 60 in which there is positioned a pressure relieving device or diaphragm 392 of the type described and claimed in my abandoned application Serial No. 139,853, filed April 30, 1937. The pan 58 extends downwardly to the line 62 and then has the inwardly inclined part 64 which joins along the line 66 with the toe board 68 (see Figure 3). A detailed description of the diaphragm and its adjacent structure is given at the end of the specification.

Each outer forwardmost part of each side of the cowl 54 has an inwardly directed wheel house part 70 formed therein. The wheel house part ends at the lines indicated at 72 and there is welded at the line 72 a piece 74 the lower edge 76 of which is welded to the sill 78 of the body. The forward edge of the piece 74 is inwardly flanged as at 80, the flange 80 forming a continuation of the flat 82 at each side of the cowl.

The front part 8 comprises the nose 48 having the integral laterally extending sides 84, the rear ends of which have the inturned flanges 86 which mate with the flats 82 on the cowl side. The lower or bottom edge 89 of the sides 84 is arcuate or curved and forms a continuation of the curve shown at 87 on the upper edge of the wheel house part 70. The curve 89 extends forwardly to the end of the nose and terminates at 88. At each side of the nose there is an arcuate section or wing 90 which conforms in curvature to the front rounded end 92 of the fenders 40.

To the flange 94 formed at the lower edge of the arcuate part 89 there is secured the inner wheel house member 96 which is of a shape best shown in Figure 2. The rear edge of the member 96 has the inturned flange 98 which mates with the lower part of the flat 82 on the cowl and also with the flange 80 on the piece 74, each part having mating openings so that they may be removably secured together by bolts and nuts. The lower edge of the member 96 also has the inturned flange 98' a continuation of the flange 98 and is secured by suitable bolts to the edge 100 of the pan 102 forming the bottom of the front compartment in the head 8 and a continuation of the floor of the vehicle proper. The member 96 has the additional flange part 98" which mates with the edge 104 and is secured thereto by bolts. The front part of the element 96 is inwardly bent on the line 106 and at the edge of the inwardly bent part there is the flange 108 provided with suitable openings and adapted to be attached to the plate 110 fixed at its ends to the flange 94 on the edge of the parts 84 and 90. An additional short arcuate plate 112 is secured to the flange 94 and to the plate 110 and fills in the space between the plate 110 and the edge of the arcuate section 90.

Referring to the fenders 40 at the opening 44 it will be noted that the edge is inwardly flanged on three sides as indicated at 114, each flange having suitable openings, the purpose of which is to fasten the grille 46 in place. At the outermost part of the opening there is secured a plate 116 which extends inwardly of the fender and which has a tab 118 formed thereon. The upper flange also has a tab 120 and these tabs as well as the tab or tongue 122 at the upper part of the plate 110 are for the purpose of securing in place the radiators 126, each radiator comprising the core 124 and the side tanks 128 and 130.

The radiators 126 are very small when compared to the ordinary radiator. The radiator at one side has the water opening 132 which receives the hot water from the engine coming from the pipe 138, the water flowing into the tank 128 and through the core 124 to the tank 130 at the opposite side. From the tank 130 the water flows through a pipe (not shown) to the radiator 126 at the opposite side and enters the tank at the outermost side of the vehicle. The water flows through the second radiator to the tank at the other side and then through a tube (not shown) passing through the opening 136, the water then being delivered to the return pipe 140 to be taken by the water pump and recirculated through the engine. The radiators 126 are rigidly held in position in the openings 44 between the plate 110 on one side and the plate 116 on the other, the tabs 118, 120, and 122 being used to apply suitable fastening means. For a disclosure of the cooling system see my copending application Serial No. 85,842, filed June 18, 1936, now Patent #2,117,040.

The inner edge of each fender 40 is provided with a flange 142 and the lower inward edge of the opening 44 has the flange 144 by means of which the fender is secured to the flange 94 and to the curved edge 87 of the wheelhouse part 70.

Preferably the parts shown in expanded relation in Figure 2 ahead of the cowl 54 and under the lid 50 are removably secured in place by means of suitable bolts and nuts. They are preferably made removable so that in case of accident in which the front part of the vehicle is damaged, all the parts may be separated and new parts applied without necessitating the replacement of the entire vehicle body.

Figures 9, 10, 11:
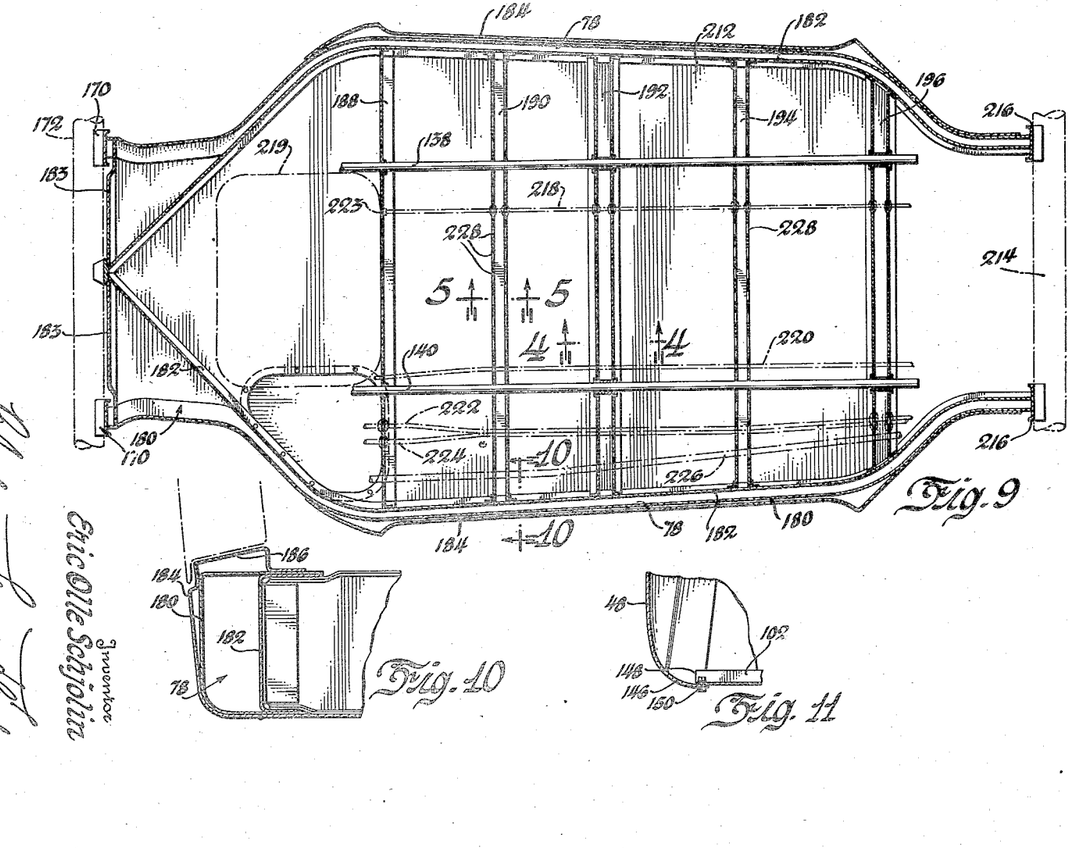
Figure 9 is a sectional plan view through the floor taken on the line 9—9 of Figure 3.
Figure 10 is a sectional view on the line 10—10 of Figure 9.
Figure 11 is a sectional detailed view showing the manner in which the lower end of the nose is secured to the vehicle floor.
Figure 12:
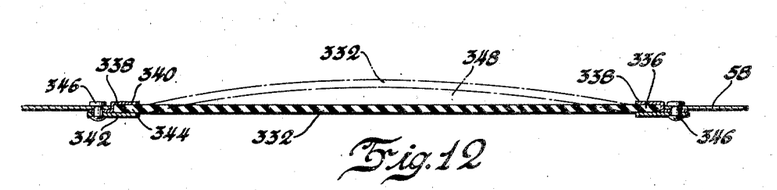
Figure 12 is an enlarged sectional detail through the opening 60 with the diaphragm shown in dotted lines in one of its operative positions.

In Figure 11 the lower part 146 of the nose is shown as secured to the forwardmost edge 148 of the pan 102 by means of the bolts and nuts 150.

Figures 3, 4, 5:
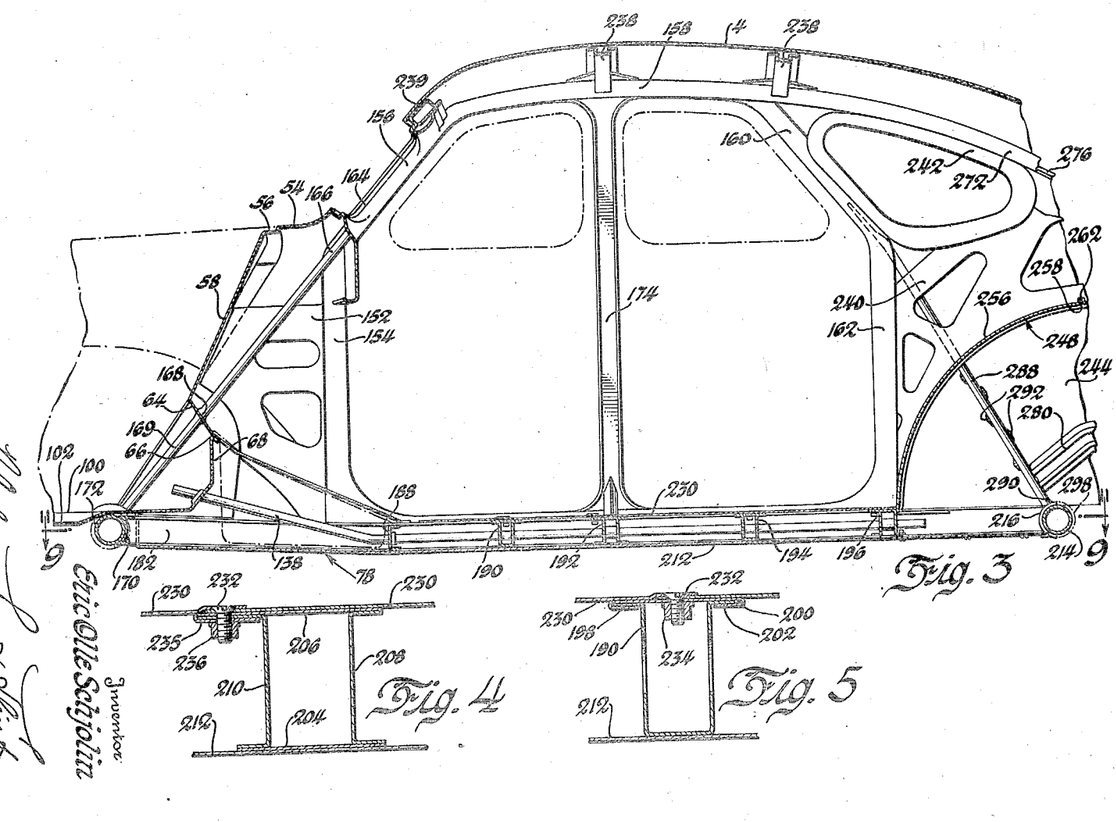
Figure 3 is a longitudinal sectional view through the middle of the body, the head and tail of the body being broken away.
Figures 4 and 5 are detailed views on the lines 4—4 and 5—5 of Figure 9.

Referring to Figure 3, the inside of the cowl at each side has the reinforcing structure 152 similar to the reinforcing structure shown in my copending application Serial No. 41,062. Over this reinforcing structure the outer skin is applied, the reinforcing structure and skin forming the front door pillar 154. This pillar 154 is fabricated substantially as that shown in my copending application and extends upwardly at the side of the windshield where it is inclined as shown at 156. The post structure then extends upwardly over the front and rear doors as at 158 and then is inclined rearwardly as at 160 to form the rear door pillar and then downwardly as at 162 to the side sill 78 where it is rigidly secured. The front posts at 156 are hollow and each has secured therein by welding at substantially the point 164 the flattened end of a tube 166, the lower end of which is welded as at 168 to the inclined part 64 of the cowl pan 58. Under the part 64 other tubes 169 are welded, one tube in line with and forming a continuation of each tube 166. The lower end of the tubes 168 are welded to the side sill and to the semi-cylinders 170 (see Figure 9) which are secured to the forward end of each side sill and are adapted to fit against front axle 172. The tubes 166 and 169 therefore form a continuation of the inclined part 156 of the front door pillar and form a bracing means for the body. The middle door pillar is indicated at 174.

The side sills 78 and lower part of the body are best shown in Figures 3 and 9. The side sills as shown in Figure 10 comprise the outer U-shaped channel 180 and the inner U-shaped channel 182 which are welded together at their mating flanges to form a box-sectioned construction. At the front of the body the channels 182 leave the channels 180 (see Figure 9) and unite at the middle of the vehicle where they are secured to transverse reinforcing members 183, secured at their outer ends to the sills 78 and their inner ends to the place of connection of the channels 182. Over the channel 180 the outer skin 184 is secured to form the bottom door jamb 186 at its upper edge. Between the side sills 78 the bottom or floor structure comprises the transverse members or connectors 188, 190, 192, 194, and 196. The front transverse member 188 is preferably a U-shaped channel as is best shown in Figure 3. The intermediate members 190, 194, and 196 are preferably U-shaped and have laterally turned flanges 198, these members being best shown in detail in Figure 5. The U-shaped flanges 198 are interconnected by the top covering plate 200 which has the inwardly bent flanges 202 which underlap the flanges 198 and form with the transverse member 190 a box-sectioned construction. The intermediate member 192 at the center of the vehicle and below the center door pillars 174 is shown in detail in Figure 4 and comprises the bottom plate 204, the top plate 206, and the side channels 208 and 210. The channels 208 and 210 have their webs facing each other and are secured together at their flanges by means of the plates 204, 206, the parts being secured together by welding. All of the transverse members 188—196 inclusive are secured at their ends by welding to the side sills 78.

The bottom of the sills and transverse members is closed by the bottom plate 212, the plate closing the entire bottom of the vehicle from the front axle 172 to the rear axle 214. The plate 212 is preferably welded to the sills and cross members, but may be removably secured in place. Where the side sills meet the rear axle 214 as shown in Figure 3, the sills have welded thereto the semi-cylindrical members 216 which fit against the axle 214.

Each of the transverse members 188, 190, 192, 194, and 196 is provided along its length with suitable openings for the passage of the water pipes or tubes 138 and 140, which extend from the rear of the vehicle to the front to transfer the water from the engine (which is positioned to the rear of the vehicle) to the radiators. The transverse members are also provided with openings for the passage of the gasoline tube 218 (connected to the fuel tank 219 at 223), the tube 220 for the speedometer cable, the tubes 222 and 224 to operate the clutch and brake pedals, and the tube 226 for the electric wiring. If desired, the transverse members may also be provided with suitable openings 228 to lighten the construction.

Over the side sills 78 and the transverse members 180—196 inclusive there is placed the floor pan 230 which is removably secured to the sills and transverse members by means of the screws 232 as shown in Figures 4 and 5. The floor pan 230 may comprise as many sections as desired in order that any section thereof may be removable to allow access to the passage or conduits between the lower pan 212 and the floor pan or plate 230. Preferably the plate 200 in Figure 5 has a boss 234 underneath having a threaded opening in which the screw 232 is received; and the inturned flange 235 on the plate 206 has a boss 236 secured thereto, the boss having a threaded opening into which the screw 232 is turned. By loosening the screws 232 the floor plate or any section thereof may be removed.

The structure of the roof 4 and its transverse bracing members 238 is the same as that shown and described in my copending application Serial No. 41,062. Similarly, the structure of the header 239 is the same.

At the rear of the vehicle the inside is provided with the reinforcing member 240 and there is also the rear window frame 242, these parts in general being the same as that shown in my copending application.

At the rear of the vehicle there are provided the inwardly extending wheelhouses 244, there being one wheelhouse member at each side of the vehicle. The outer skin 184 of the vehicle is suitably shaped on the arc 248 to receive the wheelhouse. The skin is inwardly flanged as at 250 (Figure 7) and the inner wheelhouse element 244 is secured to the skin at the flange 250. The rear fenders 38 are flanged as at 252, the flanges mating with the flanges 250 so that the parts 38, 244, and skin 184 are secured together by the bolts and nuts 254.

Figure 6:
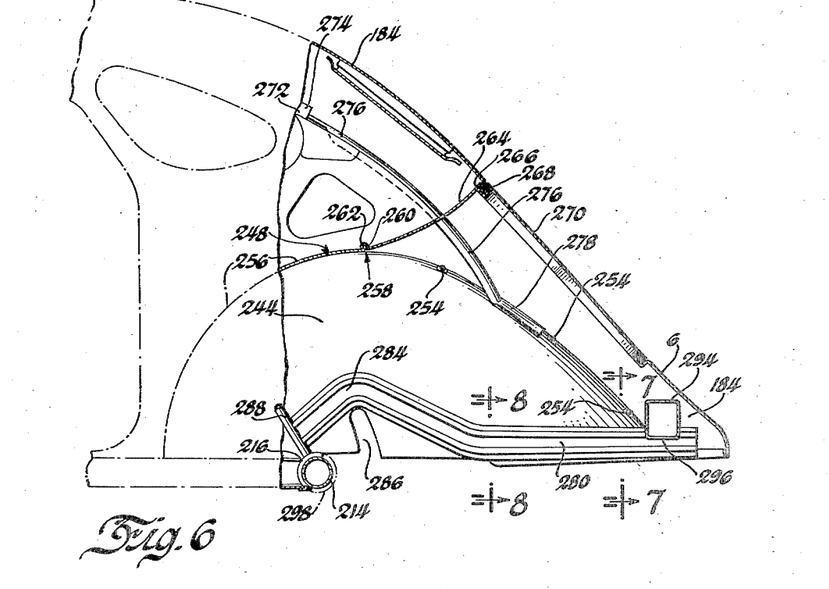
Figure 6 is a longitudinal sectional detailed view of the tail or rear end of the vehicle.

Extending across the vehicle at the rear of the rear post 162 there is the arcuate pan 256, at the lateral edges of which it is secured at the arc 248 to the wheelhouses 244 and to the outer skin 180. This arcuate plate 256 extends from the sills of the vehicle upwardly and rearwardly and terminates along the line indicated at 258 a little at the rear of a vertical plane passing through the rear axle 214. The rear edge of the plate is here provided with a small upturned flange 260 over which there fits a U-shaped flanged end 262 of a second arcuate plate 264 which extends on a reverse curve upwardly and rearwardly and is secured at 266 to the inwardly extending flange 268 formed around the edge of the opening for the rear trap door 270. Preferably the plate 264 is made removable and divided at the middle to form it in two sections. The arcuate pan 256 forms a support for the back of the rear seat 24.

The side roof rail 272 of the vehicle terminates at 274 shown in Figures 3 and 6, and a tube 276 forms a continuation thereof and has its end flattened as at 278 and welded to the rear wheelhouse 244, there being one tube at each side of the vehicle.

Figure 7:
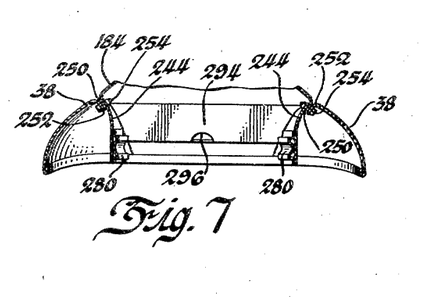
Figures 7 and 8 are sectional detailed views on the lines 7—7 and 8—8 of Figure 6.
Figure 8:
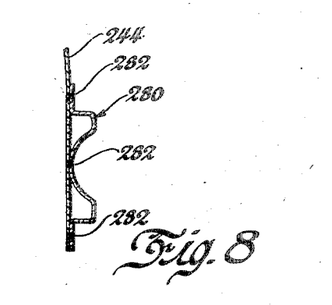

The lower edge of the tail 6 of the vehicle is reinforced at each side by means of the channel element 280, this element being best shown in section in Figures 7 and 8, and being secured on the inside of the inner wheelhouse member 244. The channel member 280 is welded at 282 to form a rigid construction at the lower end of the wheelhouse and tail portion. The channel members 280 are upwardly bent as at 284 to allow clearance for the oscillations of the rear drive axles which are adapted to move in the slots 286.

The inclined portion of the rear door 160 has tube 288 flattened and secured in the end of the inclined part 160. This tube extends downwardly and rearwardly and is secured as at 290 to the semicircular element 216. The front end of the channel 280 terminates at the tube 288 and is welded thereto. Along its length the tube 280 is welded as at 292 to the wheelhouse 244 and to the reinforcing member 240. This tube 288 forms a continuation of the inclined portion 160 and with the tubes 166 and 169 at the front forms a truss at each side of the vehicle.

At the extreme rear end of the tail part the transverse box-sectioned member 294 extends from side to side of the vehicle and is welded at its sides to the ends of the reinforcing channel 280 and to the skin 184. This member 294 is provided with an opening 296 at its lower side in which there is secured a suitable mounting member to receive a ball on a frame on which the rear engine is mounted. The forward ends of the frame for the rear engine have secured thereto the semi-cylindrical elements 298 which are complemental to the semi-cylindrical elements 216 and with the aid of suitable clamping U-bolts and nuts secure the rear axle to the body and to the engine frame of the vehicle. When the engine is removed the rear axle 214 and the frame on which the engine is mounted are removed therewith.

As is best shown in the detailed views of Figures 12–16 inclusive, the cowl pan or the dashboard 58 is provided with an opening 60 of relatively large extent, or about 5″ x 11″, into which there is positioned the yieldable flexible diaphragm or cover 332. The diaphragm 332 may be made of any suitable flexible material such as a yieldable fabric or rubber and preferably is held at two of its edges, such as the narrower side edges 344 and 336, by the clamping elements 338. Each clamping element 338 comprises one member 340 substantially Z-shaped in cross section and a flat member 342 between which the edges 344 and 336 of the diaphragm 332 are tightly held. The clamping elements 338 are secured to the edges of the opening 330 by means of rivets 346.

Figure 13:
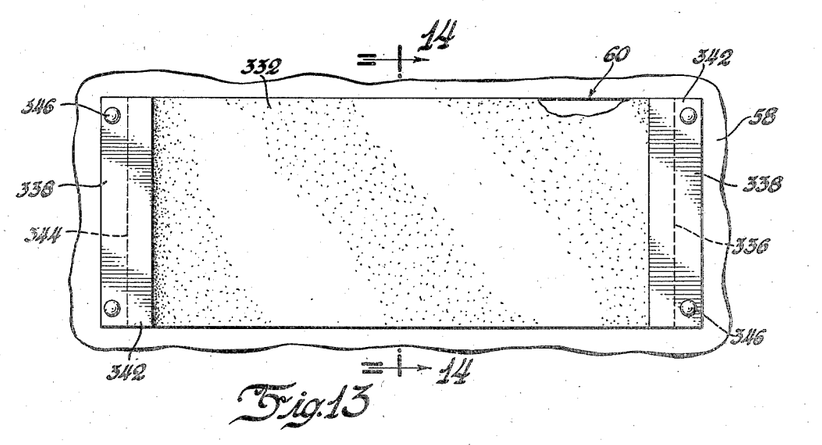
Figure 13 is an enlarged view in elevation of the structure of Figure 12.
Figures 14, 15:
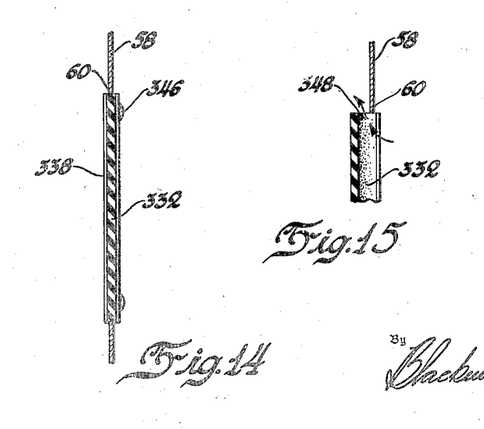
Figure 14 is a sectional detail on the line 14—14 of Figure 13.
Figures 15 and 16 are detailed views showing the manner in which the diaphragm is positioned due to internal or external air pressure.
Figure 16:
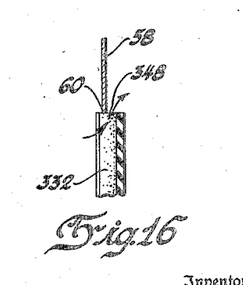

As best shown in Figure 13 the diaphragm 332 is secured to the opening 330 at the lateral edges only and is free at the top and bottom edges as is best shown in Figures 15 and 16.

Referring to Figure 15, the position of the diaphragm is shown when the rapid closing of either door 10 or 12, will cause a compression of air inside the body. The pressure of the air will cause the diaphragm 332 to be bowed and assume the dotted line position 332 in Figure 12 or the position shown in full lines in Figure 15. The movement of the diaphragm to the dotted line position in Figure 12 or the full line position in Figure 15 produces two long narrow slits or openings indicated at 348 in Figures 12 and 15. One of these openings 348 will be at the top of the diaphragm 332 and the other at the bottom and are of sufficient size to allow a ready escape of air from the vehicle so that an easy closing of the door 12 is made possible. When the door is closed and the air has escaped gradually through the slits 348, the elasticity and flexibility of the diaphragm 332 will cause it to return to the full line position in Figure 2.

To facilitate an easy opening of the door the diaphragm 332 may be bowed in the opposite direction, or to the position shown in Figure 16. That is, when either door 10 or 12 is rapidly opened with all of the windows closed, the diaphragm 332 will flex in a direction opposite to that shown in Figure 15, or in the direction shown in Figure 16. This will allow air to enter by the narrow slits 348 as is shown by the small arrows.

I claim:

1. In a metal automobile body, a cowl having a forwardly and downwardly inclined part, a forwardly extending nose having sides having complementary edges fitting against the inclined part and rigidly secured thereto, said nose extending to the extreme forward end of the vehicle, fenders rigidly secured to the nose, one fender at each side, each fender having an opening at the front thereof, inwardly extending flanges at the edge of the opening, said flanges adapted to have grilles rigidly secured thereto, one grille for each opening.

2. In a metal automobile body, a cowl having a forwardly and downwardly inclined part, a forwardly extending nose having sides having complementary edges fitting against the inclined part and rigidly secured thereto, said nose extending to the extreme forward end of the vehicle, fenders rigidly secured to the nose, one fender at each side, each fender having an opening at the front thereof, inwardly extending flanges at the edge of the opening, means rigidly to secure radiators in the openings, one radiator for each opening, and grilles secured to the fenders over the openings, one grille for each opening.

3. In a metal automobile body, a cowl having a forwardly and downwardly inclined part, a forwardly extending nose having sides having complementary edges fitting against the inclined part and rigidly secured thereto, said nose extending to the extreme forward end of the vehicle, lateral wings, one wing at each side of the tip of the nose, fenders secured to the wings and to the nose, one fender at each side of the nose, each fender having an opening at the front thereof, inwardly extending flanges at the edge of the opening, and grilles rigidly secured in the openings, one grille for each opening.

4. In a metal automobile body, a cowl having a forwardly and downwardly inclined part, a forwardly extending nose having sides having complementary edges fitting against the inclined part and rigidly secured thereto, said nose extending to the extreme forward end of the vehicle, inner wheelhouse parts secured to the nose and to the body, fenders rigidly secured to the nose and to the inner wheelhouse part, one fender at each side, each fender having an opening at the front thereof, inwardly extending flanges at the edge of the opening, and grilles rigidly secured in the openings, one grille for each opening.

5. In a metal automobile body, a cowl, a forwardly extending nose having sides fitting against the cowl and rigidly secured thereto, said nose including an inner wheelhouse part, wings at the front end of the nose, one wing at each side, plates, one plate secured to each wing, fenders, one fender secured to each side of the nose, an opening in each fender, said openings having inturned flanges, said flanges and plates forming mounting means for a radiator, there being one small radiator at each side of the nose.

6. In a metal automobile body, a cowl, a forwardly extending nose having sides fitting against the cowl and rigidly secured thereto, said nose including an inner wheel house part, wings at the front end of the nose, one wing at each side, plates, one plate secured to each side, fenders, one fender secured to each side of the nose, an opening in each fender, said openings having inturned flanges, said flanges and plates forming mounting means for radiators, there being one small radiator at each side of the nose, grilles, one grille for each radiator, said grilles secured to the fenders at the edges of the openings and over the radiators.

7. In a metal automobile body having a front section projecting from the cowl to the forwardmost part of the vehicle, said front section comprising a U-shaped nose having its sides joining onto the sides of the cowl and having lateral wings at the front end, the wings of the U-shaped nose being narrow and having their bottom edges spaced from the plane of the bottom of the vehicle, an inner wheelhouse part between the edges of the nose and the bottom of the vehicle, fenders, one fender at each side of the nose, the edges of said fenders, wheelhouse, and nose being secured together along a common line, and means to secure said wheelhouse and nose to the bottom of the vehicle.

8. In a metal automobile body having a front section projecting from the cowl to the forwardmost part of the vehicle, said front section comprising a U-shaped nose having its sides joining onto the sides of the cowl and having lateral wings at the front end, the wings of the U-shaped nose being narrow and having their bottom edges spaced from the plane of the bottom of the vehicle, an inner wheel house part between the edges of the nose and the bottom of the vehicle, fenders, one fender at each side of the nose, the edges of said fenders, wheelhouse, and nose side being secured together along a common line, and means to secure said wheelhouse and nose to the bottom of the vehicle, the front part of said fenders having openings for the reception of a radiator, each fender having one opening.

9. In a metal automobile body having side sills, a cowl, an inclined toeboard at the bottom of the cowl, a roof, front door pillars at the edge of the cowl and supporting the roof, an inclined windshield between the roof and cowl, a tube secured at its upper end inside the door pillar and extending downwardly and forwardly to the toeboard and secured thereto, a second tube secured to the toeboard under the same and forming a continuation of the first tube, the end of the second tube being secured to the sills of the body.

10. In a metal automobile body having a top, a cowl, and side sills, a door post structure extending upwardly from the sills at the cowl and across the roof edge and downwardly at the rear of the vehicle and terminating at the sills, the forward and rearwardmost upper parts of said structure being inclined, a tubular construction at the front and a tubular construction at the rear of the vehicle forming continuations of the inclined parts of the post structure, said tubular constructions extending from the post structure to the sills and secured to both, and an outer skin secured to the posts and to the tubular constructions.

11. In a metal automobile body having a top, a cowl, and side sills, a door post structure extending upwardly from the sills at the cowl and across the roof edge and downwardly at the rear of the vehicle and terminating at the sills, the forward and rearwardmost upper parts of said structure being inclined, tubular constructions at the front and rear of the vehicle forming continuations of the inclined parts of the post structure, said tubular constructions extending from the post structure to the sills and secured to both, and an outer skin secured to said posts and to said rearwardmost tubular construction.

12. In a floor structure for a metal automobile body, side sills, end and intermediate box-sectioned transverse metallic connectors secured to and connecting the sills, a metal pan under the sills and connectors and secured to both, and a metal floor pan over the sills and connectors and secured to both, said pans extending the full width of the body and said metal underpan extending the greater part of the length of the vehicle.

13. In a floor structure for a metal automobile body, two long members comprising side sills, box-sectioned transverse metallic connectors secured to and forming the interconnecting means between the sills, said connectors including end and a plurality of intermediate members, a metal pan under the sills and connectors and secured to both, a metal floor pan over the sills and connectors and secured to both, said connectors being between the underpan and the floor pan, said pans extending the full width of the body and said metal underpan extending the greater part of the length of the body, said transverse connectors being provided with a plurality of openings, and brake operating means and clutch operating means passing through said openings from the front to the rear of the vehicle.

14. In a floor structure for a metal automobile body, side sills, end and intermediate box-sectioned transverse metallic connectors secured to and connecting the sills, a metal pan under the sills and connectors and secured to both, and a metal floor pan over the sills and connectors and secured to both, said connectors being between the underpan and the floor pan, said pans extending the full width of the body and said metal underpan extending the greater part of the length of the body, said connectors provided with a plurality of aligned openings, and water pipes passing through said openings from the front to the rear of the vehicle.

15. In a metal body for vehicles, side sills, end and intermediate transverse connectors between the sills, said connectors secured at their ends to the sills, a bottom pan secured to the underside of the sills and connectors and extending the full width of the body and for the greater part of its length, a floor pan on the upper side of the sills and connectors and secured thereto, said connectors being between the underpan and the floor pan, said connectors having a plurality of aligned openings, and a plurality of tubes passing through said openings.

16. In a metallic body for a wheeled automotive vehicle, said body comprising an outer skin and side sills and cross members, a tail part extending rearwardly beyond the rear wheels, wheelhouses, one wheelhouse at each side of the rear of the vehicle, tubular struts extending upwardly and forwardly and secured to the wheelhouses, reinforcing members, one member for each side of the body and extending forwardly from the rearmost tip of the tail part forwardly to the rear ends of the body sills and being secured to the houses at the lowermost edge thereof, the foremost ends of said reinforcing members being secured to said struts, and a box-sectioned transverse member connecting the rear ends of the reinforcing members and secured thereto.

17. In a metal automobile body, a rear wheelhouse at one side, a second rear wheelhouse at the other side, said wheelhouses having their upper parts extending on an arc, and a curved pan extending from one wheelhouse to the other wheelhouse inside the body and being curved on the arc similar to the arc of the wheelhouses, said pan being secured at its ends to the body at the wheelhouses, said pan extending from the top of the wheelhouses to the floor of the body.

18. In a metal automobile body, a rear wheelhouse at one side, a second rear wheelhouse at the other side, said wheelhouses having their upper parts extending on an arc, a curved pan extending from one wheelhouse to the other wheelhouse inside the body and being curved on the arc similar to the arc of the wheelhouses, said pan being secured at its ends to the body at the wheelhouses, said pan extending from the top of the wheelhouses to the floor of the body, and a second pan secured to the wheelhouses and forming a continuation of the first pan and extending the width of the body from the top of the wheelhouses to the rear of the body and secured thereto.

19. In a metal automobile body, a rear wheelhouse at one side, a second rear wheelhouse at the other side, said wheelhouses having their upper parts extending on an arc, a curved pan extending from one wheelhouse to the other wheelhouse inside the body and being curved on the arc similar to the arc of the wheelhouses, said pan being secured at its ends to the body at the wheelhouses, said pan extending from the top of the wheelhouses to the floor of the body, and a second pan extending the width of the body and forming a continuation of the first and extending from the top of the wheelhouse to the rear of the body and curved reversely to the first mentioned pan, said second pan secured to the wheelhouses and having its rear edge secured to the body.

20. In a body for a wheeled vehicle, a cowl, wheelhousing parts formed in the sides of the cowl, a forwardly extending nose having its rear edges secured to the cowl, wheelhousing parts secured to the side edges of the nose and to the cowl and forming a continuation of the wheelhousing parts of the cowl, and fenders secured to the nose and to the cowl and concealing the wheel housing parts from exterior view.

21. In a body for a wheeled vehicle, a cowl, a pan secured to the body at the bottom of the cowl and projecting forwardly, a nose extending forwardly of the cowl and having its rear edges secured thereto, wheel housing parts secured to the nose, to the cowl and to the pan, said wheelhousing parts forming a continuation of the sides of the nose, said pan forming a floor or bottom for the rear part of the compartment formed by the nose and the wheelhousing parts, and fenders secured to the nose sides and to the wheel housing parts.

ERIC OLLE SCHJOLIN.